United States Patent
Lu et al.

(10) Patent No.: US 12,187,332 B2
(45) Date of Patent: Jan. 7, 2025

(54) HIGH-PRECISION POSITIONING SYSTEM FOR UNDERGROUND MONORAIL HOIST IN COAL MINE AND POSITIONING METHOD THEREOF

(71) Applicants: CHINA UNIVERSITY OF MINING AND TECHNOLOGY, Xuzhou (CN); XUZHOU LIREN MONORAIL TRANSPORTATION EQUIPMENT CO., LTD., Xuzhou (CN)

(72) Inventors: Hao Lu, Xuzhou (CN); Zhencai Zhu, Xuzhou (CN); Yidong Zhang, Xuzhou (CN); Yuxing Peng, Xuzhou (CN); Yu Tang, Xuzhou (CN); Hua Chen, Xuzhou (CN); Zaigang Xu, Xuzhou (CN); Mingzhong Wang, Xuzhou (CN); Mai Du, Xuzhou (CN); Hengzhen Hu, Xuzhou (CN); Fuping Zheng, Xuzhou (CN)

(73) Assignees: CHINA UNIVERSITY OF MINING AND TECHNOLOGY, Xuzhou (CN); XUZHOU LIREN MONORAIL TRANSPORTATION EQUIPMENT CO., LTD., Xuzhou (CN)

( * ) Notice: Subject to any disclaimer, the term of this patent is extended or adjusted under 35 U.S.C. 154(b) by 0 days.

(21) Appl. No.: 18/247,874

(22) PCT Filed: Sep. 30, 2022

(86) PCT No.: PCT/CN2022/123325
§ 371 (c)(1),
(2) Date: Apr. 4, 2023

(87) PCT Pub. No.: WO2023/201993
PCT Pub. Date: Oct. 26, 2023

(65) Prior Publication Data
US 2024/0043247 A1    Feb. 8, 2024

(30) Foreign Application Priority Data
Apr. 18, 2022 (CN) .......................... 202210402959.2

(51) Int. Cl.
*B61L 25/02* (2006.01)
*B66C 11/06* (2006.01)
(Continued)

(52) U.S. Cl.
CPC ............ *B61L 25/026* (2013.01); *B66C 11/06* (2013.01); *E21F 13/00* (2013.01); *G01C 21/16* (2013.01)

(58) Field of Classification Search
CPC ........ B61L 25/026; B66C 11/06; E21F 13/00; G01C 21/16
See application file for complete search history.

(56) References Cited

U.S. PATENT DOCUMENTS 5,592,883 A * 1/1997 Andress, III ............. B61B 3/02
                                                      105/154
7,537,092 B2 * 5/2009 Birrer ................... B66B 1/3492
                                                      187/391
(Continued)

FOREIGN PATENT DOCUMENTS

| CN | 104370210 A | 2/2015 |
| CN | 105651280 A | 6/2016 |

(Continued)

OTHER PUBLICATIONS

Written Opinion of the International Searching Authority issued in International application No. PCT/CN2022/123325; mailed Dec. 16, 2022; Beijing, China, 8 pgs.
(Continued)

*Primary Examiner* — Naeem Taslim Alam
(74) *Attorney, Agent, or Firm* — HAUPTMAN HAM, LLP

(57) ABSTRACT

A high-precision positioning system for a monorail hoist in a mine includes two gear carriers symmetrically arranged on
(Continued)

both sides of an I-beam track. Each of the gear carriers includes a positioning wheel and a plurality of travelling wheels. The travelling wheels are travelling on an upper end face of a bottom plate of the I-beam track, and the positioning wheel is in engagement transmission with a rack at a lower end of the bottom plate of the I-beam track. The gear carriers include an installation bracket and a connecting seat configured to connect the monorail hoist. The installation bracket includes an inertial measuring unit and a single-chip microcomputer that are electrically connected with each other. The positioning wheel includes a rotation angle sensor and the rotation angle sensor is electrically connected to the single-chip microcomputer. A headstock at both ends of the monorail hoist includes a coordinate updating unit.

8 Claims, 4 Drawing Sheets

(51) Int. Cl.
*E21F 13/00* (2006.01)
*G01C 21/16* (2006.01)

(56) References Cited

U.S. PATENT DOCUMENTS

| | | | | |
|---|---|---|---|---|
| 10,722,805 | B1* | 7/2020 | Kalama | G06F 3/16 |
| 2003/0028323 | A1* | 2/2003 | Zeitler | G05D 1/0282 |
| | | | | 701/408 |
| 2006/0259211 | A1* | 11/2006 | Fischer | H01Q 1/3225 |
| | | | | 701/19 |
| 2008/0058981 | A1* | 3/2008 | Andretsch | B22D 11/14 |
| | | | | 700/146 |
| 2009/0067673 | A1* | 3/2009 | Hofmann | G01D 5/34746 |
| | | | | 382/103 |
| 2015/0360705 | A1* | 12/2015 | Niinomi | B61L 27/40 |
| | | | | 701/118 |
| 2016/0327454 | A1* | 11/2016 | Onda | B60B 17/0003 |
| 2017/0197333 | A1* | 7/2017 | Barnes | B66C 5/04 |
| 2019/0047786 | A1* | 2/2019 | Suzuki | H01L 21/67769 |
| 2021/0331716 | A1* | 10/2021 | Deng | B61C 13/04 |
| 2021/0388562 | A1* | 12/2021 | Kou | E01B 25/26 |
| 2022/0266881 | A1* | 8/2022 | Auer | G06T 7/60 |
| 2023/0391588 | A1* | 12/2023 | Maier | B66C 15/065 |

FOREIGN PATENT DOCUMENTS

| | | |
|---|---|---|
| CN | 108862031 A | 11/2018 |
| CN | 212315347 U | 1/2021 |
| CN | 113479771 A | 10/2021 |
| CN | 113741442 A | 12/2021 |
| CN | 114261431 A | 4/2022 |
| CN | 114803861 A | 7/2022 |
| DE | 3844161 A1 | 7/1990 |
| EP | 1043262 A1 | 10/2000 |

OTHER PUBLICATIONS

International Search Report issued in International application No. PCT/CN2022/123325; mailed Dec. 16, 2022; Beijing, China, 5 pgs.

* cited by examiner

HIGH-PRECISION POSITIONING SYSTEM FOR UNDERGROUND MONORAIL HOIST IN COAL MINE AND POSITIONING METHOD THEREOF

RELATED APPLICATIONS

The present application is a U.S. National Phase of International Application Number PCT/CN2022/123325 filed Sep. 30, 2022, and claims priority to Chinese Application Number 202210402959.2 filed Apr. 18, 2022.

TECHNICAL FIELD

The present disclosure relates to the field of positioning of an underground monorail hoist in a coal mine, in particular to a high-precision positioning system for an underground monorail hoist in a coal mine and a positioning method thereof.

BACKGROUND

The monorail hoist locomotive is a kind of rail locomotive specially running on the special I-beam above the mine roadway. With the development of the unmanned underground, for the safety of monorail hoist drivers, it is necessary to perform a high-precision positioning for the position of the monorail hoist locomotive to facilitate the precise control for the unmanned monorail hoist. However, since GPS signals cannot be used in the mine roadway where the monorail hoist operates, positioning technologies such as UWB are generally used to position the position of the monorail hoist in the prior art. The UWB positioning technology relies on network signals, so it is necessary to lay out network equipment and base stations during the running process of the monorail hoist, and the construction and maintenance costs are high. And if any one of the network equipment fails, it will cause problems in UWB positioning, and further it is impossible to accurately position the position of the monorail hoist. Therefore, how to implement the high-precision positioning of the position of the monorail hoist and realize the unmanned development requirements for intelligent mines are the technical problems to be solved urgently in this field.

SUMMARY

In view of the above-mentioned technical deficiencies, the objectives of the present disclosure are to provide a high-precision positioning system for an underground monorail hoist in a coal mine and a positioning method thereof, which utilizes the high-precision engagement between the positioning wheel and the rack on the I-beam track, and then calculates the displacement of the positioning wheel to implement the high-precision positioning of the monorail hoist.

In order to solve the above-mentioned technical problems, the technical solutions adopted in the present disclosure are as follows.

A high-precision positioning system for an underground monorail hoist in a coal mine and a method thereof are provided in the present disclosure. The system comprises: a gear-type displacement measuring device and a plurality of coordinate positioning units uniformly distributed on an I-beam track. The gear-type displacement measuring device includes two gear carriers symmetrically arranged on both sides of the I-beam track, and the two gear carriers are fixedly connected with each other.

Each of the gear carriers is provided with a positioning wheel and a plurality of travelling wheels. The travelling wheels are travelling on an upper end surface of a bottom plate of the I-beam track, and the positioning wheel is in engagement transmission with a rack at a lower end of the bottom plate of the I-beam track.

The gear carriers are further provided with an installation bracket and a connecting seat configured to connect the monorail hoist. The installation bracket is provided with an inertial measuring unit and a single-chip microcomputer that are electrically connected with each other.

The positioning wheel is provided with a rotation angle sensor configured to detect a rotation angle of the positioning wheel, and the rotation angle sensor is electrically connected to the single-chip microcomputer.

A headstock at both ends of the monorail hoist is provided with a coordinate updating unit capable of transmitting a signal with a coordinate positioning unit, and the coordinate updating unit is electrically connected to the single-chip microcomputer.

A positioning method for a positioning system for an underground monorail hoist in a coal mine is further provided in the present disclosure. The method includes the following steps.

In Step S1, a global route of all I-beam tracks is constructed in a computer.

In Step S2, position and attitude information of the monorail hoist are extracted by utilizing an inertial measuring unit to recognize a travelling direction of the monorail hoist and draw a real-time route of the monorail hoist during a travelling process.

In Step S3, the coordinate positioning units are arranged, and the three-dimensional coordinate information of the coordinate positioning units including positions where the coordinate positioning units are located is obtained.

In Step S4, between two adjacent coordinate positioning units, a travelling mileage of the monorail hoist is calculated and obtained by the sing-chip microcomputer through utilizing angle information transmitted by a rotation angle sensor. In combination with direction information measured by the inertial measuring unit, a travelling distance of the monorail hoist in a forward direction is calculated. In combination with a coordinate position of the monorail hoist in the global route in a previous coordinate positioning unit, a precision three-dimensional coordinate position of the monorail hoist between the two coordinate positioning units is obtained.

In Step S5, when the monorail hoist passes through the coordinate positioning unit, a precise position of the monorail hoist is corrected by the coordinate positioning unit, and the three-dimension coordinate position of the monorail hoist in the global route is updated.

At the same time, data transmitted by the inertial measuring unit and the rotation angle sensor are automatically initialized, and a positioning is performed between the subsequent two coordinate positioning units according to the method in Step 4 by taking an updating point as a starting point.

In Step S6, Steps S4 and S5 are repeated, the three-dimensional coordinate position of the monorail hoist in the global route is displayed in real-time and accurately.

Preferably, the specific methods of Step S1 are as follows.

In S1-1, the I-beam tracks are scanned by a laser radar in advance to obtain point cloud data for the I-beam tracks and nearby irrelevant point data, and all of the point cloud data are transmitted to the computer.

In S1-2, the point cloud data for the I-beam tracks and the nearby irrelevant point cloud data are processed to filter out the irrelevant point cloud data and retain only the point cloud data for the I-beam tracks, and the point cloud data for the I-beam tracks are materialized in the computer to obtain a three-dimensional solid model of the I-beam tracks.

In S1-3, according to the three-dimensional solid model of the I-beam tracks, center lines on bottom surfaces of the I-beam tracks are taken as the global route, and a three-dimensional coordinate of each point in the global route is given in the computer, and the coordinated global route is transmitted to the single-chip microcomputer.

Preferably, an application scenario of the inertial measuring unit in Step 2 is as follows.

In S2-1, when the monorail hoist moves back and forth on a straight road section, a travelling direction of the monorail hoist is recognized by the inertial measuring unit.

In S2-2, when the monorail hoist enters switches, the inertial measuring unit recognizes one switch entered by the monorail hoist.

Preferably, in Step S3, arrangement ways of the coordinate positioning unit are as follows.

Firstly, one coordinate positioning unit is arranged at an initial point of the monorail hoist access to the I-beam track and at each switch.

Then, a plurality of coordinate positioning units are installed between the two adjacent coordinate positioning units installed in above-mentioned at an interval distance d.

When a distance s between a k-th coordinate positioning unit and the coordinate positioning unit at a subsequent switch is d<s<2d, a (k+1)-th coordinate positioning unit is installed.

When the distance s between the k-th coordinate positioning unit and the coordinate positioning unit at the subsequent switch is 0<s<d, the (k+1)-th coordinate positioning unit is stopped for installation.

Eventually, according to the above method, all coordinate positioning units are completed for installation.

Preferably, in Step 3, the steps for determining the distance d are as follows.

Firstly, according to technical parameters for a selected inertial measuring unit corresponding to a brand model, a time accumulative error function f(t) is calculated.

Then, a maximum allowable time accumulative error of the inertial measuring unit is set as Δ max, let f(t1)=Δ max and t1 is resolved. In combination with an average running velocity of the monorail hoist, a running distance d≤v*t1 is taken herein, and the running distance d is less than or equal to a travelling distance when the positioning wheel produces a maximum allowable displacement error.

Preferably, the method that the single-chip microcomputer calculates the mileage of the monorail hoist is as follows: a displacement of the monorail hoist is set as S, a total arc length rotated by a reference circle of the positioning wheel is set as L, a rotation angle of the positioning wheel is set as n, a reference circle radius of the positioning wheel is set as r, then S=L=nr.

Preferably, the coordinate positioning unit is a bar-code, and the bar-code includes the coordinate position of the coordinate positioning unit located in the global route. The coordinate updating unit is a laser scanner, and a position of the monorail hoist is updated by the laser scanner through scanning the coordinate positioning unit.

The beneficial effects of the present disclosure are as follows.

1. The present disclosure can accurately calculate the mileage of the monorail hoist by calculating the rotation arc length of the positioning wheel, and can accurately determine the position of the monorail hoist located on the I-beam track in combination with the constructed global route of the I-beam track, and since the positioning accuracy is related to the size of the positioning wheel, the positioning accuracy can be improved by reducing the pitch of the positioning wheel.

2. Compared with the odometer that is widely used at present, when the odometer used by the present disclosure measures the mileage, the odometer is installed on the wheel, but when the vehicle is running, the wheel will slip. However, the present disclosure reduces the calculation error caused by wheel slip through the way of gear engagement, and improves the positioning accuracy.

3. In the present disclosure, each time the monorail hoist passes through a coordinate positioning unit, data initialization is performed on the information of the inertial measuring unit and the rotation angle sensor, which reduces the calculation error of the inertial measuring unit caused by the time accumulation.

BRIEF DESCRIPTION OF THE DRAWINGS

In order to describe the embodiments of the present disclosure or the technical solutions in the prior art more clearly, the following briefly introduces the accompanying drawings that is required to be used in the description of the embodiments or the prior art. It will be apparent that the accompanying drawings in the following description are merely some embodiments of the present disclosure. For those of ordinary skill in the art, other accompanying drawings can also be obtained according to these accompanying drawings without any creative efforts.

DESCRIPTION OF REFERENCE NUMBERS

1. I-beam track; 2. Travelling wheel; 3. Connecting rod; 4. Positioning wheel; 5. Cross bar; 6. Fixing support; 7. Rotation angle sensor; 9. Connection seat; 12. Single-chip microcomputer; 13. Inertial measuring unit; 18. Installation bracket; 19. Rack; 24. Coordinate updating unit; 26. Power supply; 29. Coordinate positioning unit.

DETAILED DESCRIPTION OF THE EMBODIMENTS

The following clearly and completely describes the technical solutions in embodiments of the present disclosure with reference to the accompanying drawings in the embodiments of the present disclosure. It will be apparent that the described embodiments are merely some but not all of the embodiments of the present disclosure. All other embodiments obtained by a person of ordinary skill in the art based on the embodiments of the present disclosure without creative effects shall fall within the protection scope of the present disclosure.

Figure 1:
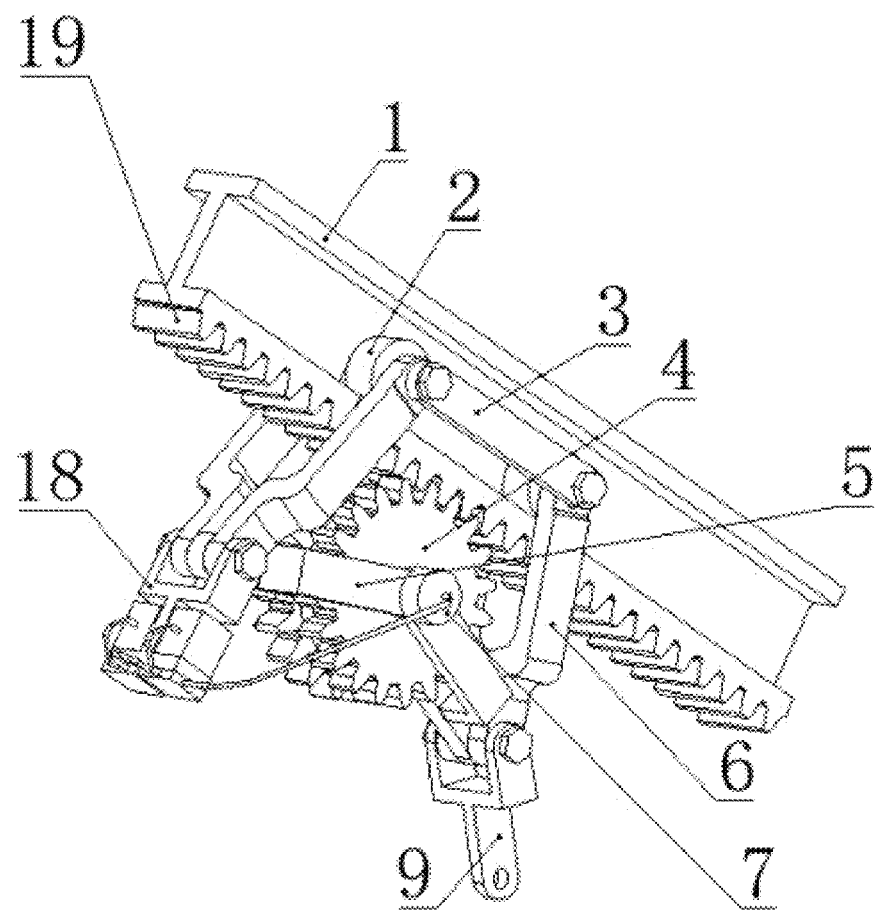
FIG. 1 illustrates a structural schematic diagram of a high-precision positioning system for an underground monorail hoist in a coal mine provided by an embodiment of the present disclosure.
Figure 2:
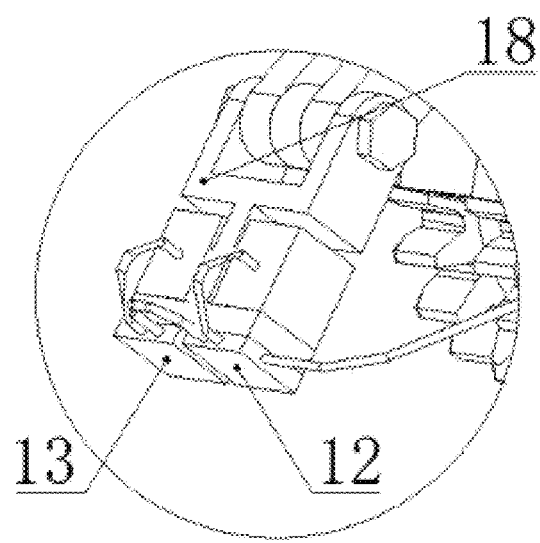
FIG. 2 illustrates a schematic diagram of an installation position of a single-chip microcomputer provided by an embodiment of the present disclosure.
Figure 3:
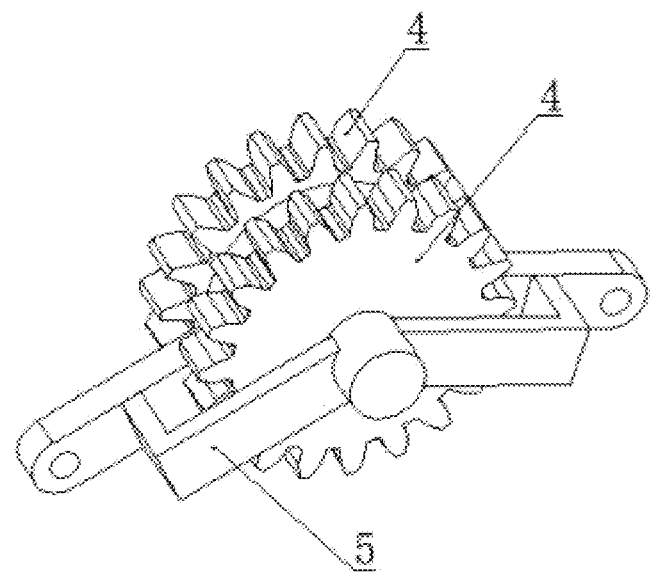
FIG. 3 illustrates a schematic diagram of a position relationship between two positioning wheels provided by an embodiment of the present disclosure.
Figure 4:
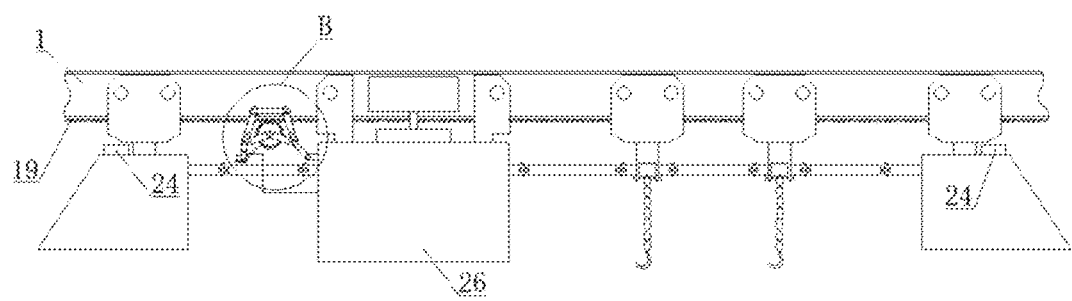
FIG. 4 illustrates an installation schematic diagram of a high-precision positioning system for a monorail hoist in a coal mine on the monorail hoist provided by an embodiment of the present disclosure.
Figure 5:
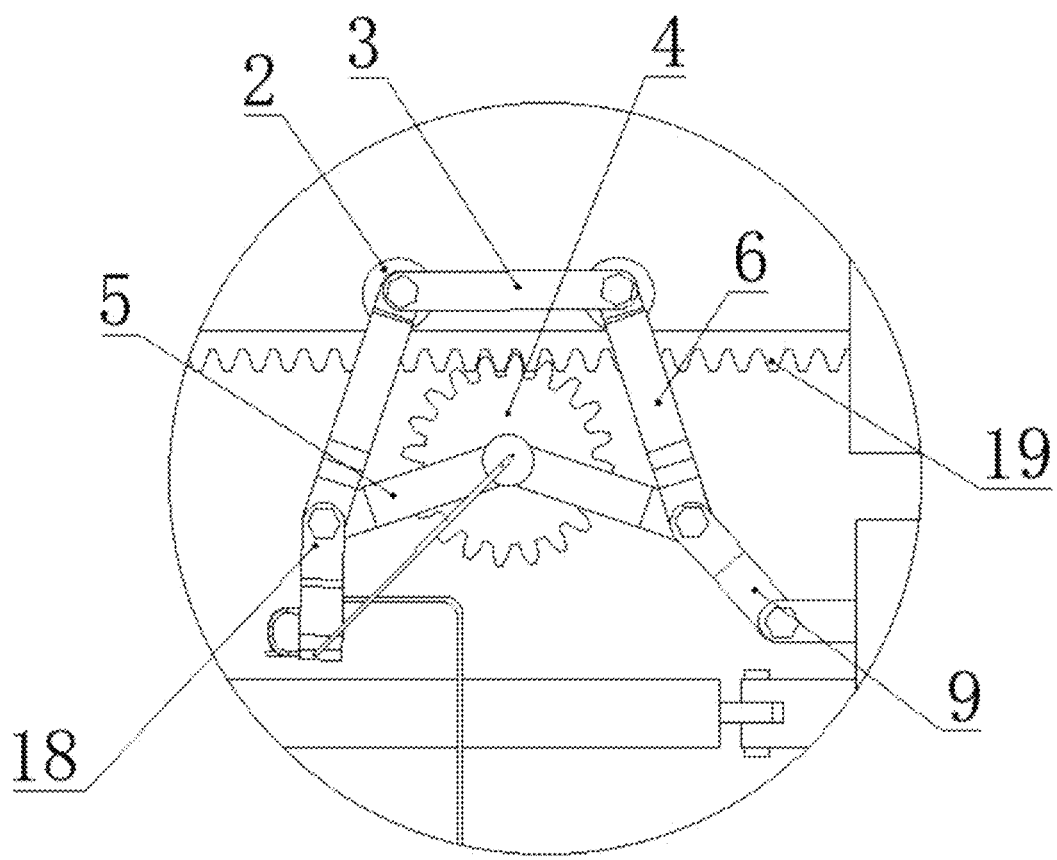
FIG. 5 illustrates an enlarged view of a part B in FIG. 5 provided by an embodiment of the present disclosure.
Figure 6:
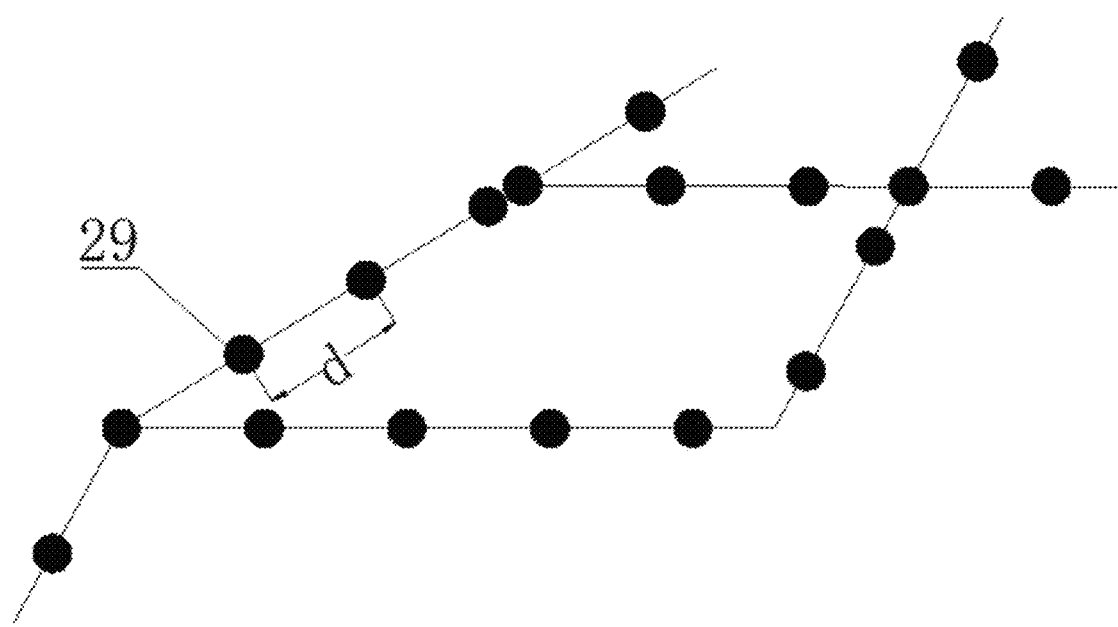
FIG. 6 illustrates a global route map of an installation and composition of coordinate positioning units provided by an embodiment of the present disclosure.

As illustrated in FIG. 1 to FIG. 6, a high-precision positioning system for an underground monorail hoist in a coal mine includes the followings.

A gear-type displacement measuring device and a plurality of coordinate positioning units 29 are uniformly distributed on an I-beam track 1.

The gear-type displacement measuring device includes two gear carriers symmetrically arranged on both sides of the I-beam track 1, and the two gear carriers are fixedly connected with each other.

Each of the gear carriers is provided with a positioning wheel 4 and a plurality of travelling wheels 2. The travelling wheels 2 are travelling on an upper end surface of a bottom plate of the I-beam track 1. The positioning wheel 4 is in engagement transmission with a rack 19 at a lower end of the bottom plate of the I-beam track 1. The pitch of the positioning wheel 4 is short, which satisfies that the positioning accuracy of the positioning wheel 4 is higher than that of an inertial measuring unit 13.

The gear carriers are further provided with an installation bracket 18 and a connecting seat 9 configured to connect the monorail hoist, and the installation bracket 18 is provided with the inertial measuring unit 13 and a single-chip microcomputer 12 that are electrically connected with each other.

The positioning wheel 4 is further provided with a rotation angle sensor 7 configured to detect a rotation angle of the positioning wheel 4, and the rotation angle sensor is electrically connected to the single-chip microcomputer 12.

A headstock at both ends of the monorail hoist is provided with a coordinate updating unit 24 capable of transmitting signals with the coordinate positioning unit 29, and the coordinate updating unit 24 is electrically connected to the single-chip microcomputer 12.

The single-chip microcomputer 12 is communicatedly connected to an external control center, which is configured to control and display the single-chip microcomputer 12 through the external control center.

Each of the gear carriers includes a connecting rod 3, two travelling wheels 2 are symmetrically arranged at both ends of the connecting rod 3, and two fixing supports 6 are symmetrically fixed at both ends of the connecting rod 3, and an installation bracket 18 is fixed at one end of one fixing support 6 away from the travelling wheel 2, and a connecting seat 9 is fixed at one end of the other fixing support 6 away from the travelling wheel 2. The two positioning wheels 4 are rotatably connected to the same rotating shaft, and both ends of the rotating shaft are respectively rotatably connected with a supporting plate, two cross bars 5 are respectively fixedly on the supporting plate, and the two cross bars 5 are respectively fixedly connected with the two fixing supports 6 at the same side.

A positioning method for a positioning system for an underground monorail hoist in a coal mine is further provided in the present disclosure. The method comprises the following steps.

In Step S1, a global route of all I-beam tracks 1 is constructed in a computer.

The specific methods of Step S1 are as follows.

In S1-1, the I-beam tracks 1 are scanned by a laser radar in advance to obtain point cloud data for the I-beam tracks 1 and nearby irrelevant point data. and all of the point cloud data are transmitted to the computer.

In S1-2, the point cloud data for the I-beam tracks 1 and the nearby irrelevant point cloud data are processed to filter out the irrelevant point cloud data and retain only the point cloud data for the I-beam tracks 1, and the point cloud data for the I-beam tracks 1 are materialized in the computer to obtain a three-dimensional solid model of the I-beam tracks 1.

In S1-3, according to the three-dimensional solid model of the I-beam tracks 1, center lines on bottom surfaces of the I-beam tracks 1 are taken as the global route, and a three-dimensional coordinate of each point in the global route is given in the computer, and the coordinated global route is transmitted to the single-chip microcomputer 12.

In Step S2, position and attitude information of the monorail hoist are extracted by utilizing an inertial measuring unit 13 to recognize a travelling direction of the monorail hoist and draw a real-time route of the monorail hoist during a running process.

The application scenario of the inertial measuring unit 13 is as follows.

In S2-1, when the monorail hoist moves back and forth on a straight road section, the travelling direction of the monorail hoist is recognized by the inertial measuring unit 13.

In S2-2, when the monorail hoist enters switches, the inertial measuring unit 13 recognizes one switch entered by the monorail hoist entering.

In Step S3, the coordinate positioning units 29 are arranged, the three-dimensional coordinate information of the coordinate positioning units 29 including positions where the coordinate positioning units 29 are located is obtained.

The arrangements ways of the coordinate positioning unit 29 are as follows.

Firstly, one coordinate positioning unit 29 is arranged at an initial point of the monorail hoist access to the I-beam track 1 and at each switch.

Then, a plurality of coordinate positioning units 29 are installed between the two adjacent coordinate positioning units 29 installed in above-mentioned at an interval distance d.

When a distance s between the k-th coordinate positioning unit 29 and the coordinate positioning unit 29 at the subsequent switch is d≤s<2d, then the (k+1)-th coordinate positioning unit 29 is installed.

When the distance s between the k-th coordinate positioning unit 29 and the coordinate positioning unit 29 at the subsequent switch is 0<s<d, the (k+1)-th coordinate positioning unit 29 is stopped for installation.

Eventually, according to the above method, all coordinate positioning units 29 are completed for installation.

In Step S3, the steps for determining the distance d are as follows.

Firstly, according to technical parameters for the selected inertial measuring unit 13 corresponding to a brand model, a time accumulative error function f(t) is calculated.

Then, a maximum allowable time accumulative error of the inertial measuring unit 13 is set to be Δ max, let f(t1)=Δ max, and t1 is resolved. In combination with an average running velocity of the monorail hoist, the running distance d≤v*t1 is taken herein, and the running distance d is less than or equal to a travelling distance when the positioning wheel 4 produces a maximum allowable displacement error.

In Step S4, between the two adjacent coordinate positioning units 29, a travelling mileage of the monorail hoist is calculated and obtained by the sing-chip microcomputer 12 through utilizing angle information transmitted by the rotation angle sensor 7. In combination with direction information measured by the inertial measuring unit 13, a travelling distance of the monorail hoist in a forward direction is calculated. In combination with a coordinate position of the monorail hoist in the global route in a previous coordinate positioning unit 29, a precision three-dimensional coordinate position of the monorail hoist between the two coordinate positioning units 29 is obtained.

The method that the single-chip microcomputer 12 calculates the mileage of the monorail hoist is as follows: a displacement of the monorail hoist is set as S, a total arc length rotated by a reference circle of the positioning wheel 4 is set as L, a rotation angle of the positioning wheel 4 is set as n, a reference circle radius of the positioning wheel is set as r, then $S=L=nr$.

In Step S5, when the monorail hoist passes through the coordinate positioning unit 29, a precise position of the monorail hoist is corrected by the coordinate positioning unit 29, and the three-dimension coordinate position of the monorail hoist in the global route is updated.

At the same time, the data transmitted by the inertial measuring unit 13 and the rotation angle sensor 7 are automatically initialized, and a positioning is performed between the subsequent two coordinate positioning units 29 according to the method in Step 4 by taking the updating point is as a starting point.

In Step S6, Steps S4 and S5 are repeated, the three-dimensional coordinate position of the monorail hoist in the global route is displayed in real-time and accurately.

The coordinate positioning unit 29 is a bar-code, and the bar-code includes the coordinate position of the coordinate positioning unit 29 located in the global route. The coordinate updating unit 24 is a laser scanner, and a position of the monorail hoist is updated by the laser scanner through scanning the coordinate positioning unit 29.

In the present disclosure, on the one hand, preferably, the rotation angle sensor 7 is preferably an MCJS type angle sensor. Only from the characteristics of the rotation angle sensor 7 itself, the measuring angle error is approximately 0.05%, that is, the travelling error is approximately 5 cm for every 100 m the monorail hoist travels. On the other hand, the positioning accuracy of the positioning wheel 4 can be improved by reducing the pitch. When the pitch of the positioning wheel 4 is 5 mm, the single-chip microcomputer 12 calculates the displacement of the positioning wheel 4 with 5 mm as a unit to increase. Similarly, when the pitch of the positioning wheel 4 is 1 mm, the single-chip microcomputer 12 calculates the displacement of the positioning wheel 4 with 1 mm as a unit to increase, and the smaller the increased unit, the more accurate the positioning. In addition, the positioning accuracy of the positioning wheel 4 can be further improved by adjusting the positioning of the coordinate positioning unit 29. The positioning accuracy of the present disclosure is controllable.

Compared with UWB positioning technology, because the UWB positioning technology adopts a wireless signal transmission means, the indoor positioning accuracy can only reach 10 cm, and the underground environment is complex, the positioning accuracy is worse.

Compared with the inertial measuring unit 13, the general inertial measuring unit 13 can generally only output the angular velocity and the acceleration, but cannot directly output the displacement without an integration means. But the integration means will have a time accumulative error, the longer the operation time, the higher the error. Taking the high-precision fiber-optical inertial navigation as an example, the travelling error of the monorail hoist is approximately 80 cm for every 100 m the monorail hoist travels.

Compared with the existing odometer, the existing odometer is directly installed on the driving wheel for counting. In the case where the monorail hoist starts and stops frequently, the driving wheel will cause a huge positioning error due to slippage, which cannot satisfy the requirement for high-precision positioning.

It will be apparent that various modifications and variations can be made by those skilled in the art in the present disclosure without departing from the spirit and scope of the present disclosure. Thus, if these modifications and variations of the present disclosure belong to the scopes of the claims of the present disclosure and their equivalents, the present disclosure is also intended to include these modifications and variations.

What is claimed is:

1. A high-precision positioning system for an underground monorail hoist in a coal mine, comprising:
    a gear-type displacement measuring device and a plurality of coordinate positioning units uniformly distributed on an I-beam track,
    wherein the gear-type displacement measuring device includes two gear carriers symmetrically arranged on both sides of the I-beam track, and the two gear carriers are fixedly connected with each other;
    each of the gear carriers is provided with a positioning wheel and a plurality of travelling wheels, the travelling wheels are travelling on an upper end surface of a bottom plate of the I-beam track, and the positioning wheel is in engagement transmission with a rack at a lower end of the bottom plate of the I-beam track;
    the gear carriers are further provided with an installation bracket and a connecting seat configured to connect the monorail hoist, and the installation bracket is provided with an inertial measuring unit and a single-chip microcomputer that are electrically connected with each other;
    the positioning wheel is provided with a rotation angle sensor configured to detect a rotation angle of the positioning wheel, and the rotation angle sensor is electrically connected to the single-chip microcomputer; and
    a headstock at each end of the monorail hoist is provided with a respective coordinate updating unit capable of transmitting a signal to a coordinate positioning unit, and the coordinate updating unit is electrically connected to the single-chip microcomputer.

2. The high-precision positioning system of claim 1, wherein a positioning method for the high-precision positioning system comprises:
    S1, constructing, in a computer, a global route of all I-beam tracks;
    S2, extracting, by utilizing an inertial measuring unit, position and attitude information of the monorail hoist to recognize a travelling direction of the monorail hoist and draw a real-time route of the monorail hoist during a travelling process;
    S3, arranging coordinate positioning units, and obtaining three-dimensional coordinate information of the coordinate positioning units including positions where the coordinate positioning units are located;

S4, calculating and obtaining, by a single-chip microcomputer, a travelling mileage of the monorail hoist through utilizing angle information transmitted by a rotation angle sensor between two adjacent coordinate positioning units; calculating, in combination with direction information measured by the inertial measuring unit, a travelling distance of the monorail hoist in a forward direction; and obtaining, in combination with a coordinate position of the monorail hoist in the global route in a previous coordinate positioning unit, a precision three-dimensional coordinate position of the monorail hoist between the two adjacent coordinate positioning units;

S5, correcting, by the coordinate positioning unit, a precise position of the monorail hoist when the monorail hoist passes through the coordinate positioning unit, and updating the three-dimensional coordinate position of the monorail hoist in the global route;

at the same time, initializing data transmitted by the inertial measuring unit and the rotation angle sensor automatically, and performing, by taking an updating point as a starting point, a positioning between a subsequent two coordinate positioning units according to S4; and S6, repeating S4 to S5, and displaying the three-dimensional coordinate position of the monorail hoist in the global route in real-time and accurately.

3. The high-precision positioning system of claim 2, wherein S1 comprises:

S1-1, scanning, by a laser radar, the I-beam tracks in advance to obtain point cloud data for the I-beam tracks and nearby irrelevant point cloud data, and transmitting all of the point cloud data to the computer;

S1-2, processing the point cloud data for the I-beam tracks and the nearby irrelevant point cloud data to filter out the irrelevant point cloud data and retain only the point cloud data for the I-beam tracks, materializing the point cloud data for the I-beam tracks in the computer to obtain a three-dimensional solid model of the I-beam tracks; and S1-3, taking, according to the three-dimensional solid model of the I-beam tracks, center lines on bottom surfaces of the I-beam tracks as the global route, and giving a three-dimensional coordinate of each point in the global route in the computer and transmitting the coordinated global route to the single-chip microcomputer.

4. The high-precision positioning system of claim 3, wherein an application scenario of the inertial measuring unit in S2 is as follows:

S2-1, recognizing, by the inertial measuring unit, a travelling direction of the monorail hoist, when the monorail hoist moves back and forth on a straight road section; and S2-2, recognizing, by the inertial measuring unit, one switch entered by the monorail hoist when the monorail hoist enters switches.

5. The high-precision positioning system of claim 4, wherein in S3, arrangement ways of the coordinate positioning unit are:

firstly, arranging one coordinate positioning unit at an initial point of the monorail hoist access to the I-beam track and at each switch;

then, installing, between the two adjacent coordinate positioning units installed in the above-mentioned, a plurality of coordinate positioning units at an interval distance d;

installing, when a distance s between a k-th coordinate positioning unit and the coordinate positioning unit at a subsequent switch is d<s<2d, a (k+1)-th coordinate positioning unit;

stopping installing, when the distance s between the k-th coordinate positioning unit and the coordinate positioning unit at the subsequent switch is 0<s<d, the (k+1)-th coordinate positioning unit; and eventually, completing installing, according to the above method, all coordinate positioning units.

6. The high-precision positioning system of claim 5, wherein in S3, steps for determining the distance d are as follows:

firstly, calculating, according to technical parameters for a selected inertial measuring unit corresponding to a brand model, a time accumulative error function f(t); and then setting a maximum allowable time accumulative error of the inertial measuring unit as Δmax, letting f(t1)=Δmax and resolving t1, taking, in combination with an average running velocity of the monorail hoist, a running distance d≤v*t1 herein, wherein the running distance d is less than or equal to a travelling distance when the positioning wheel produces a maximum allowable displacement error.

7. The high-precision positioning system of claim 2, wherein in S4, the method for calculating the mileage of the monorail hoist by the single-chip microcomputer is:

setting S as a displacement of the monorail hoist, L as a total arc length rotated by a reference circle of the positioning wheel, n as a rotation angle of the positioning wheel, and r as a reference circle radius of the positioning wheel, then S=L=nr.

8. The high-precision positioning system of claim 2, wherein each coordinate positioning unit is a bar-code, and the bar-code includes a coordinate position of the coordinate positioning unit located in the global route; and each coordinate updating unit is a laser scanner, and a position of the monorail hoist is updated by the laser scanner through scanning the coordinate positioning unit.

* * * * *